(12) United States Patent
Wei

(10) Patent No.: US 11,413,561 B2
(45) Date of Patent: Aug. 16, 2022

(54) FILTRATION SYSTEM WITH BYPASS AND FILTERING CONFIGURATIONS, AND COMPONENTS AND METHODS OF OPERATION THEREOF

(71) Applicant: Tianjin Yunda Industry and Trade Co. Ltd., Tianjin (CN)

(72) Inventor: Enyu Wei, Tianjin (CN)

(73) Assignee: TIANJIN YUNDA INDUSTRY AND TRADE CO. LTD, Tianjin (CN)

( * ) Notice: Subject to any disclaimer, the term of this patent is extended or adjusted under 35 U.S.C. 154(b) by 284 days.

(21) Appl. No.: 16/703,228

(22) Filed: Dec. 4, 2019

(65) Prior Publication Data

US 2021/0121802 A1 Apr. 29, 2021

(30) Foreign Application Priority Data

Oct. 25, 2019 (CN) .......................... 201911024338.X
Oct. 25, 2019 (CN) .......................... 201921808937.6

(51) Int. Cl.
*B01D 35/30* (2006.01)
*B01D 35/147* (2006.01)
*B01D 29/33* (2006.01)

(52) U.S. Cl.
CPC ........... *B01D 35/147* (2013.01); *B01D 29/33* (2013.01); *B01D 35/30* (2013.01); *B01D 2201/165* (2013.01); *B01D 2201/304* (2013.01); *C02F 2201/005* (2013.01)

(58) Field of Classification Search
CPC ...... B01D 35/147; B01D 29/33; B01D 35/30; B01D 2201/165; B01D 2201/304; B01D 2201/302; B01D 2201/4015; B01D 2201/4076; C02F 2201/005; C02F 9/005; C02F 1/283; C02F 2201/004; C02F 2201/006; C02F 2301/043
See application file for complete search history.

(56) References Cited

U.S. PATENT DOCUMENTS

2019/0106333 A1 * 4/2019 Campbell ............... C02F 9/005

FOREIGN PATENT DOCUMENTS

WO   WO-2014056161 A1 * 4/2014 ........... B01D 35/306

* cited by examiner

*Primary Examiner* — Waqaas Ali
(74) *Attorney, Agent, or Firm* — Mei & Mark LLP

(57) ABSTRACT

A water filtration system is provided. The system may include a connector and a filter configured to be mounted in the connector. The connector may include a connector body, a connector inner core, a connector core baffle, a connector body water inlet of the connector body, and a connector body water outlet of the connector body. The water filtration system may have a filtering configuration and a bypass configuration. In the filtering configuration, the water filtration system may be configured to direct water through the filter. In the bypass configuration, the water filtration system may be configured to direct water out the connector body water outlet without passage through the filter. The water filtration system may be in the filtering configuration when the filter is fully mounted in the connector. The water filtration system may be in the bypass configuration when the filter is not fully mounted in the connector.

19 Claims, 15 Drawing Sheets

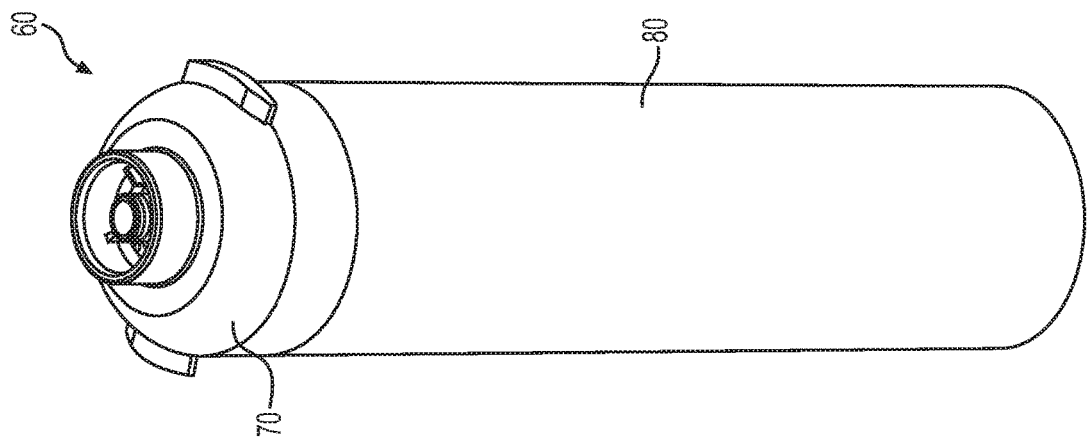
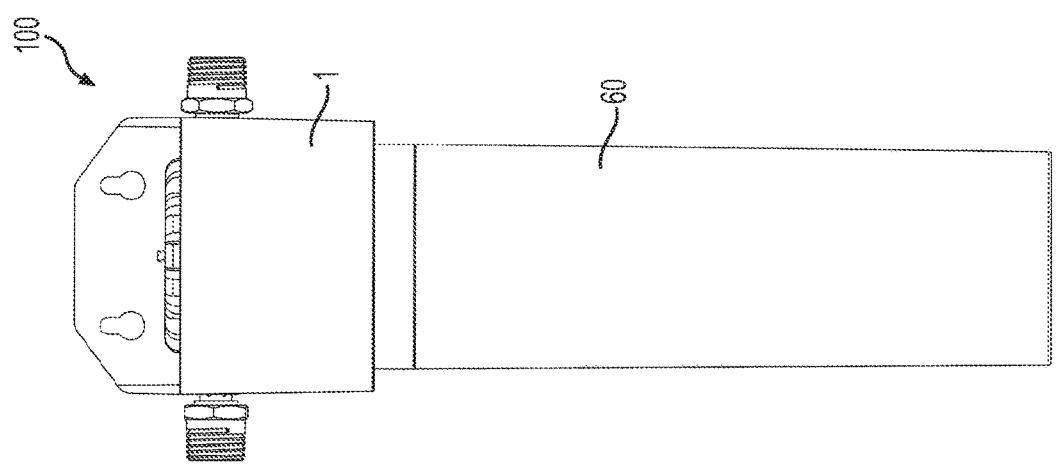

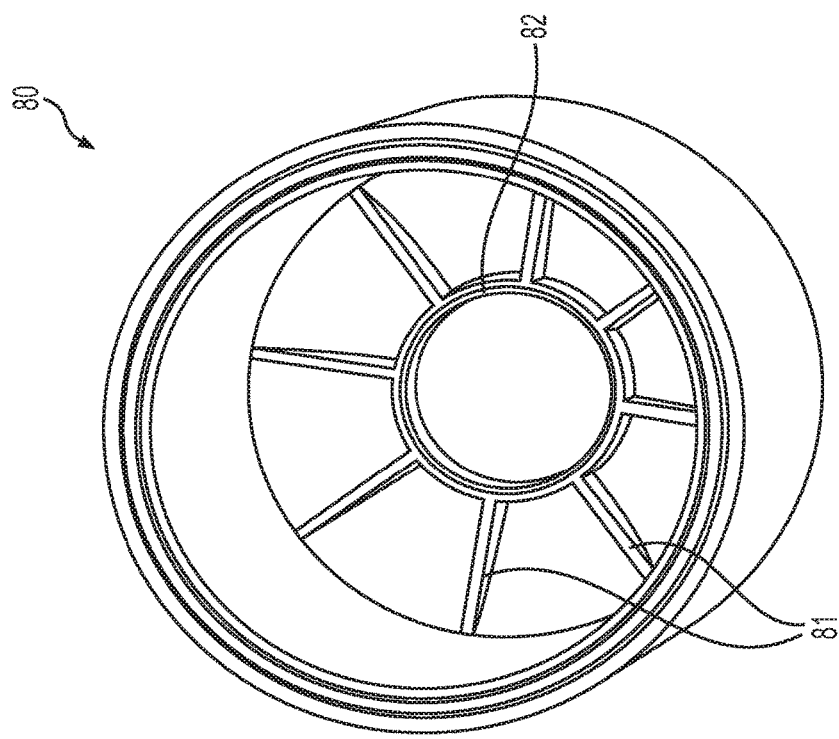
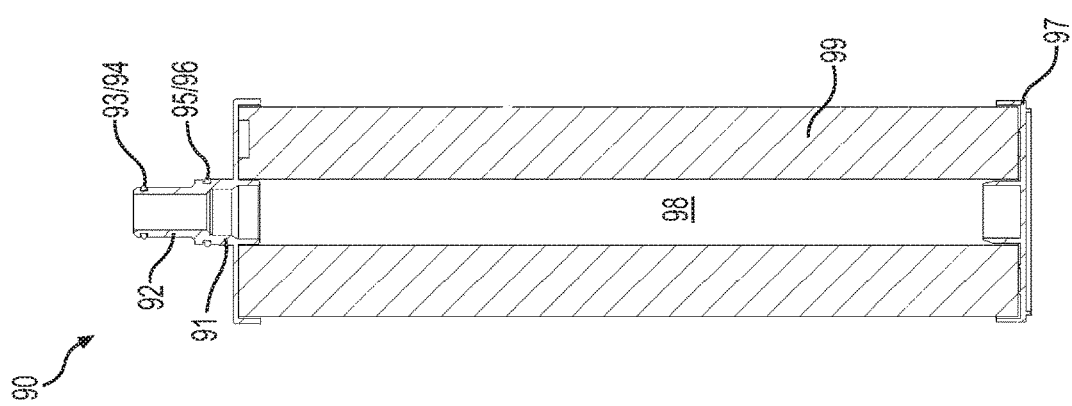

FILTRATION SYSTEM WITH BYPASS AND FILTERING CONFIGURATIONS, AND COMPONENTS AND METHODS OF OPERATION THEREOF

This application claims priority to Chinese Application Ser. Nos. 201921808937.6, and 201911024338.X, both filed on Oct. 25, 2019, the disclosures of which are herein incorporated by reference in their entireties.

TECHNICAL FIELD

The present disclosure relates to the field of filtration, and more particular to a water filtration system with a bypass configuration and a filtering configuration.

BACKGROUND

In typical filtration systems, a water inlet valve needs to be closed when an off-platform water purifier and/or the filter core of a filter bottle structure are replaced, which may adversely affect the water supply of a whole building, residence, or area being serviced. When the filter core is replaced, the filter core may need to be disassembled, and the water stored in a filter bottle may need to be poured out; this wastes water and requires a user undertake additional work.

Further, when an off-platform water purifier is installed to provide household drinking water, one or more extra adapters may be required due to variances among commonly used connecting components, for example, when the household water joint is of a direct insertion type or an internal thread type. Therefore, the inconsistency among household water joints increases the difficulty and expense of a filtration system installation.

SUMMARY

The present disclosure provides a description of systems, components, and methods of operation thereof to address the perceived needs described above, as well as to improve technologies relating to filtration systems.

In one embodiment, a water filtration system is provided. The water filtration system may include a connector and a filter configured to be mounted in the connector. The connector may include a connector body, a connector inner core, a connector core baffle, a connector body water inlet of the connector body, and a connector body water outlet of the connector body. The water filtration system may have a filtering configuration and a bypass configuration. In the filtering configuration, the water filtration system may be configured to direct water received via the connector body water inlet through the filter and out the connector body water outlet. In the bypass configuration, the water filtration system may be configured to direct water received via the connector body water inlet out the connector body water outlet without passage through the filter. The water filtration system may be in the filtering configuration when the filter is fully mounted in the connector. The water filtration system may be in the bypass configuration when the filter is partially mounted in the connector and when the filter is not mounted in the connector.

The water filtration system may be configured to switch between the filtering configuration and the bypass configuration by a rotation of the connector inner core about a central axis within the core body.

The connector inner core may include an inner core inlet and an inner core outlet. The inner core inlet may be L-shaped. The inner core outlet may be L-shaped. The inner core inlet may be configured to direct water from the connector body water inlet into the filter when the water filtration system is in the filtering configuration. The inner core outlet may be configured to direct water from the filter to the connector body water outlet when the water filtration system is in the filtering configuration.

The connector body may define a main connector body cavity. The connector body may include an annular protrusion disposed at the top of the main connector body cavity and around the central axis. The connector inner core may include a plurality of inner core rotation support protrusions disposed at the top of the inner core around the central axis. The plurality of inner core rotation support protrusions may be at least partially disposed within the annular protrusion. The plurality of inner core rotation support protrusions may define a plurality of inner core rotation support gaps. The connector may be configured to direct water through the plurality of inner core rotation support gaps when the water filtration system is in the bypass configuration.

The connector body may define a main connector body cavity. The connector body may include a plurality of inwardly extending flanges disposed near the bottom of the connector body. The filter may include a plurality of outwardly extending flanges disposed near the top of the filter. The inwardly extending flanges may be configured to engage with the outwardly extending flanges of the filter when the filter is fully mounted in the connector.

The connector body may define a main connector body cavity. The connector body may include a stop element disposed at the top of the main connector body cavity. The stop element may be configured to limit the rotation of the connector inner core within the connector body to between 60 and 120 degrees. The stop element may be configured to limit the rotation of the connector inner core within the connector body to approximately 90 degrees.

The inner core outlet may include a filter tip receiving cavity disposed at a bottom of the connector inner core along the central axis. The bottom of the connector inner core may define a plurality of engagement cavities surrounding the filter tip receiving cavity. The inner core inlet may include inner core inlet exit disposed at a bottom of the connector inner core between at least two of the plurality of engagement cavities.

The filter may include an end cover and a filter tip. The end cover may include an end cover central opening along the central axis, a plurality of end cover engagement protrusions surrounding the end cover central opening, and an end cover inlet disposed between at least two of the end cover protrusions. The filter tip may be at least partially disposed within the end cover central opening.

The filter tip receiving cavity may be configured to receive the filter tip. The plurality of end cover engagement protrusions may be configured to engage with the plurality of engagement cavities. The end cover inlet may be configured to align with the inner core inlet exit when the filter is partially or fully mounted in the connector. An engagement between the plurality of end cover engagement protrusions and the plurality of engagement cavities, respectively, may be configured to enable the rotation of the connector inner core by a rotation of the filter.

The water filtration system may further include an inner core baffle sealing ring and an inner core filter sealing ring. The connector inner core may include an inner core baffle sealing groove and an inner core filter sealing groove. The inner core baffle sealing ring may be at least partially disposed within the inner core baffle sealing groove. The inner core baffle sealing ring may engage with the connector inner core and the connector core baffle to form a first seal. The inner core filter sealing ring may be at least partially disposed within the inner core filter sealing groove. When the filter is fully mounted in the connector, the inner core filter sealing ring may engage with the connector inner core and the filter to form a second seal.

The water filtration system may further include an inner core inlet sealing ring and an inner core outlet sealing ring. The connector inner core may include an inner core inlet sealing groove disposed about an entrance to the inner core inlet. The connector inner core may include an inner core outlet sealing groove disposed about an exit to the inner core outlet. The inner core inlet sealing ring may be at least partially disposed within the inner core inlet sealing groove. The inner core outlet sealing ring may be at least partially disposed within the inner core outlet sealing groove. The inner core inlet sealing ring may engage with the connector inner core and the connector body to form a first seal. The inner core outlet sealing ring may engage with the connector inner core and the connector body to form a second seal.

The inner core outlet may include a filter tip receiving cavity around the central axis. The filter may include a filter tip. The filter tip may be disposed within the filter tip receiving cavity when the filter is fully mounted in the connector.

The water filtration system may further include a filter tip outlet upper sealing ring. The filter tip may include a filter tip outlet upper sealing groove. The filter tip outlet upper sealing ring may be at least partially disposed within the filter tip outlet upper sealing groove. The filter tip outlet upper sealing ring may engage with an interior surface of the connector inner core and the filter tip to form a seal when the filter is mounted in the connector.

The water filtration system may further include an inlet quick insertion assembly and an outlet quick insertion assembly. The inlet quick insertion assembly may be configured to be installed within the connector body water inlet. The outlet quick insertion assembly may be configured to be installed within the connector body water outlet. The inlet quick insertion assembly may include a first threaded barb, a first O-ring, a first baffle, and a first quick-connection claw. The outlet quick insertion assembly may include a second threaded barb, a second O-ring, a second baffle, and a second quick-connection claw.

In another embodiment, a connector for a water filtration system is provided. The connector may include a connector body, a connector inner core, a connector core baffle, a connector body water inlet of the connector body, and a connector body water outlet of the connector body. The connector may be configured to receive a filter to be mounted therein. The connector may have a filtering configuration and a bypass configuration. In the filtering configuration, the connector may be configured to direct water received via the connector body water inlet through the filter and out the connector body water outlet. On the bypass configuration, the connector may be configured to direct water received via the connector body water inlet out the connector body water outlet without passage through the filter. The connector may be configured to be in the filtering configuration when the filter is fully mounted in the connector. The connector may be configured to be in the bypass configuration when the filter is partially mounted in the connector and when the filter is not mounted in the connector. The connector may be configured to switch between the filtering configuration and the bypass configuration by a rotation of the connector inner core within the core body.

In yet another embodiment, a filter for a water filtration system is provided. The filter may include a filter cover body, an end cover, and a filter core including a filter tip. The end cover may include an end cover central opening extending along a central axis of the filter, a plurality of end cover engagement protrusions surrounding the central axis and extending parallel with the central axis, an end cover inlet disposed between at least two of the end cover protrusions, and a plurality of outwardly extending flanges disposed on the outside of the end cover.

The filter may further include a filter tip outlet upper sealing ring and a filter tip outlet lower sealing ring. The filter tip may include a filter tip outlet upper sealing groove and a filter tip outlet lower sealing groove. The filter tip outlet upper sealing ring may be at least partially disposed within the filter tip outlet upper sealing groove. The filter tip outlet lower sealing ring may be at least partially disposed within the filter tip outlet lower sealing groove. The filter tip outlet lower sealing ring may engage with an interior surface of the filter cover body and the filter tip to form a seal.

It is to be understood that the descriptions herein are exemplary and explanatory only, and are not restrictive of the invention.

BRIEF DESCRIPTION OF THE DRAWINGS

The accompanying drawings, which are incorporated into and constitute a part of this specification, illustrate several embodiments and aspects of the methods, systems, and system components described herein and, together with the description, serve to explain the principles of the invention.

FIG. 1A is a front view of a filtration system, in accordance with exemplary embodiments.

FIG. 1B is a perspective view of a filter of the filtration system, in accordance with exemplary embodiments.

FIG. 8B is a cross-sectional view of a filter core of the filter, in accordance with exemplary embodiments.

FIG. 8C is a cross-sectional top perspective view of a filter cover body of the filter, in accordance with exemplary embodiments.

DETAILED DESCRIPTION

Filtration System 100 Structure

With reference to, FIG. 1A, filtration system 100 with a bypass configuration and a filtering configuration is provided. The filtration system 100 may include connector 1 and filter 60. Filter 60 may be mounted in connector 1. As discussed further herein, when filter 60 is fully mounted in connector 1, water flowing through filtration system 100 may flow through filter 60 and filtration system 100 may be understood to be in the filtering configuration. FIGS. 3A, 3B, 4, and 8E depict filtration system 100, or portions thereof, in the filtering configuration. When filter 60 is partially mounted in connector 1 or not mounted at all, water flowing through the filtration system 100 may not flow through filter 60, and filtration system 100 may be understood to be in the bypass configuration. FIGS. 3C-3E depict system 100, or portions thereof, in the bypass configuration.

Connector 1

Figure 2:
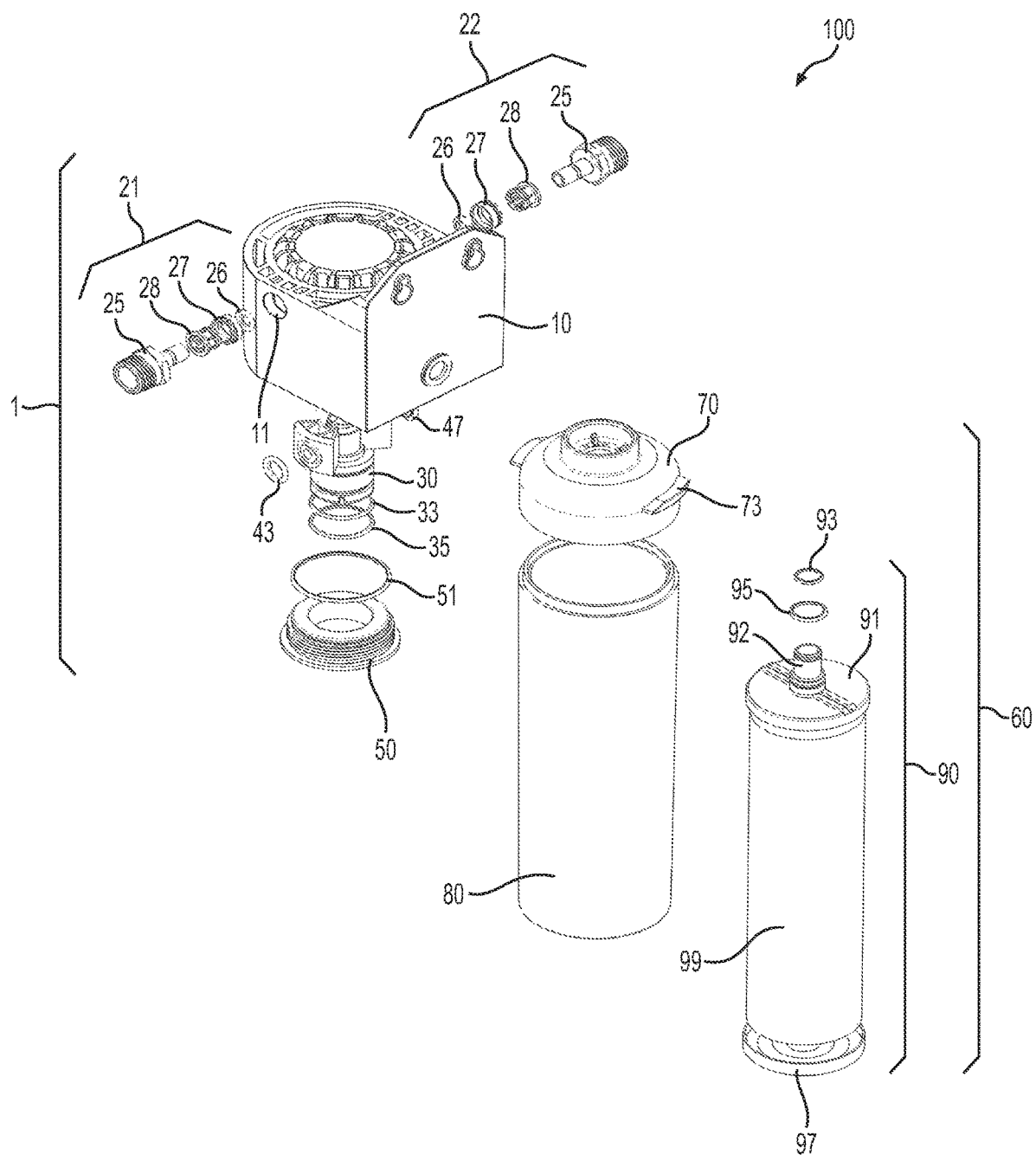
FIG. 2 is an exploded view of the filtration system, in accordance with exemplary embodiments.

With reference to FIG. 2, connector 1 may include connector body 10, connector inner core 30, and connector core baffle 50, as well as a number of sealing and installation elements.

Connector Body 10

Figure 9:
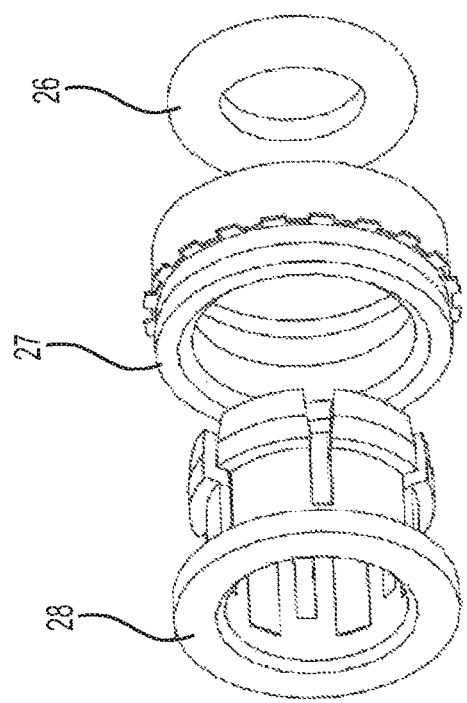
FIG. 9 is an exploded view of a portion of a quick-insertion assembly of the connector, in accordance with exemplary embodiments.

With reference to FIGS. 5A-5D, connector body 10 may include connector body inlet 11 through which water from a water source may be received by filtration system 100, and connector body outlet 12 through which filtered or unfiltered water may exit filtration system 100. Although the figures of this disclosure depict the right side of connector body 10 as including connector body inlet 11 and the left side of connector body 10 as including connector body outlet 12, the disclosure is not so limited and their positions may be swapped in alternative embodiments. Connector 1 may also include inlet quick insertion assembly 21 and outlet quick insertion assembly 22, which may be installed in connector body inlet 11 and connector body outlet 12, respectively. Quick insertion assemblies 21 and 22 are shown exploded in FIG. 2 and FIG. 9 (in part); and in cross-section in FIGS. 3C, 3D, 3E, and 4. As shown, in some embodiments, each quick insertion assembly 21/22 may include O-ring 26, insertion baffle 27, quick-connection claw 28, and threaded barb 25. The threaded portion of each threaded barb 25 may be connected to internally threaded inlet and outlet pipes, respectively, in which system 100 is installed. Where inlet and/or outlet pipes terminate in barbs or already include such connectors, threaded barbs 25 may be omitted.

The back of the connector body 10 may include hanging element 15, which may include one or more mounting holes through which screws or the like may be used to securely mount filtration system 100 for use.

Figure 5A:
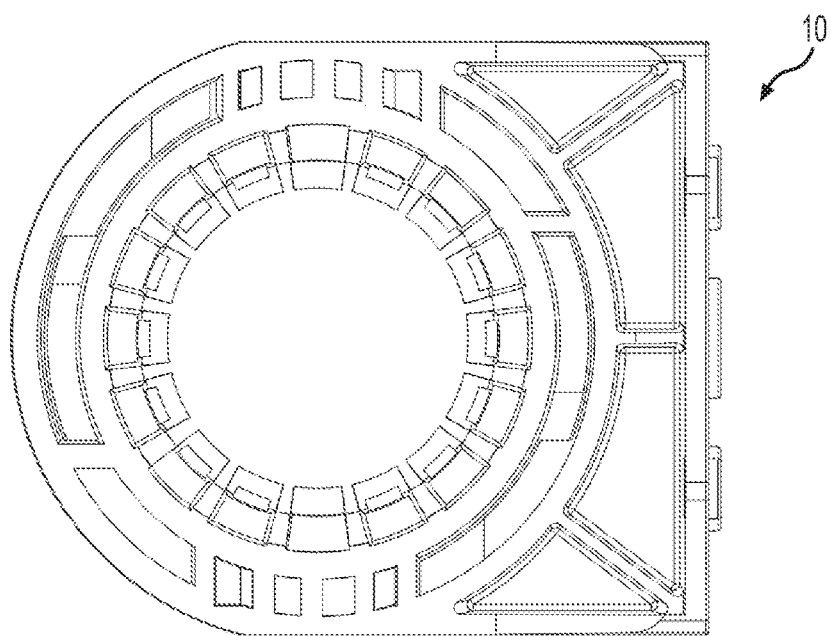
FIGS. 5A-5D are a top view, a perspective underside view, a perspective cross-sectional view, and a perspective view, respectively, of a connector body of the connector of the filtration system, in accordance with exemplary embodiments.
Figure 5B:
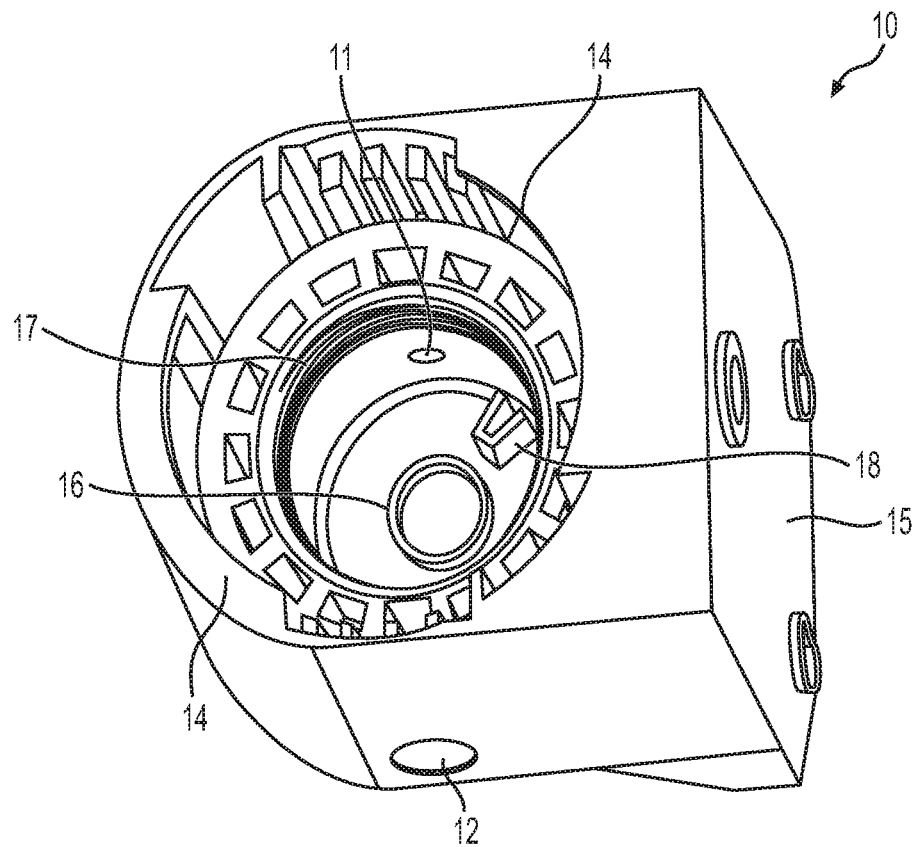
Figure 5C:
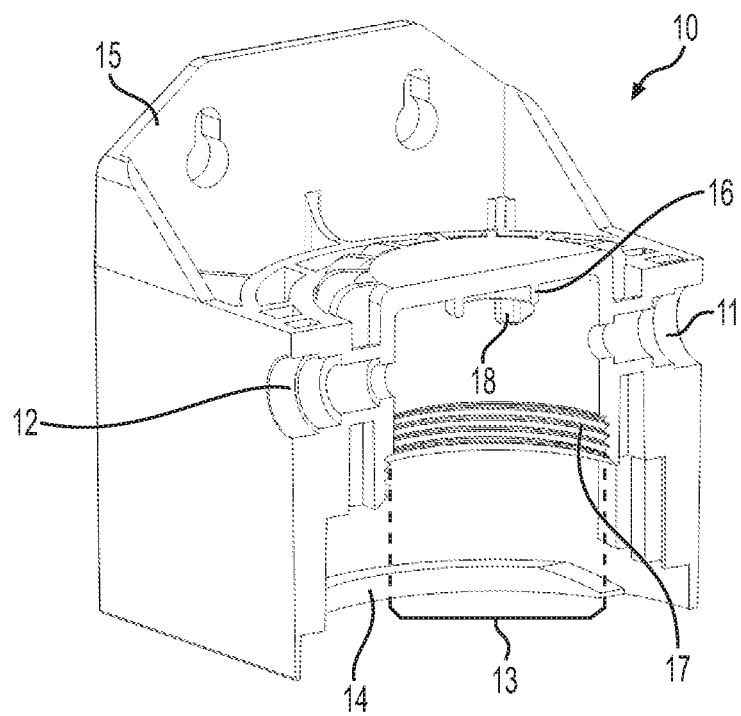
Figure 5D:
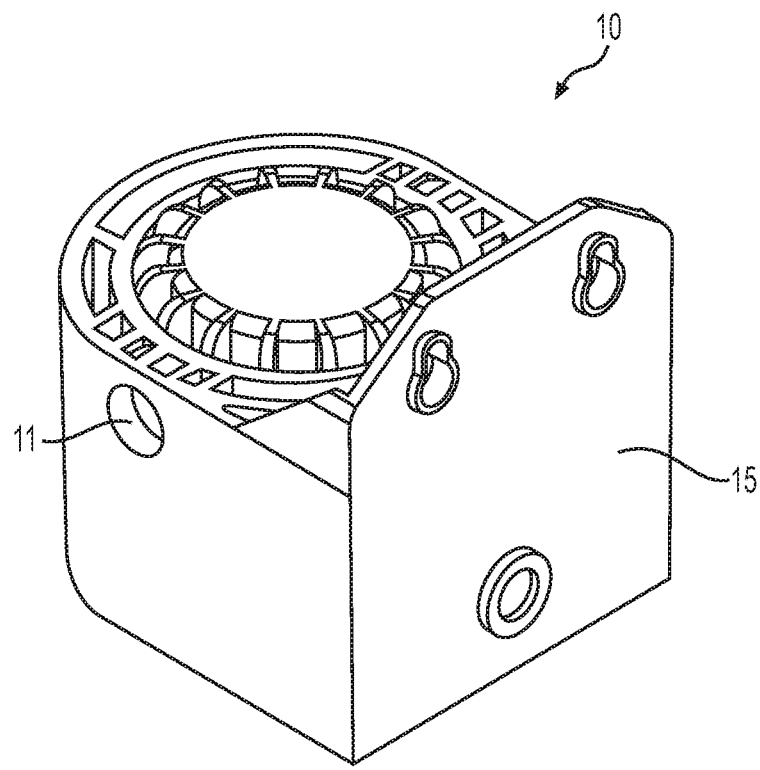

As best viewed in FIGS. 5B and 5C, connector body 10 may define main connector body cavity 13 to which connector body inlet 11 and connector body outlet 12 connect. Adjacent to connector body cavity 13, connector body 10 may include internal threading 17, annular protrusion 16, and stop element 14. Internal threading 17 may be configured to engage with external threading 55 of connector core baffle 50.

Annular protrusion 16 may surround a central axis of connector body 10 (as well as connector 1 and system 100). Annular protrusion 16 may be disposed on the top internal surface of connector body 10. Annular protrusion 16 may be configured to engage with inner core rotation support protrusions 37 of connector inner core 30. Such engagement may support connector inner core 30 within connector body 10 while permitting its rotation therein.

Stop element 18 may be disposed on the top internal surface of connector body 10, preferably external to annular protrusion 16. Stop element 18 may be configured to limit the rotation of connector inner core 30 within connector body 10, for example, to an allowable rotation of approximately 90 degrees. In other embodiments, rotation of between 60 and 120 degrees may be permitted.

Connector body 10 may also include a plurality of inwardly extending flanges 14 disposed near the bottom of connector body 10. For example, connector body 10 may include two inwardly extending flanges 14 located along or near the opening of connector body cavity 13. Inwardly extending flanges 14 may be configured to engage with outwardly extending flanges 73 of filter 60 and thereby serve to secure filter 60 within connector 1 when mounted, as well as aid in mounting.

Connector Inner Core 30

Figure 7A:
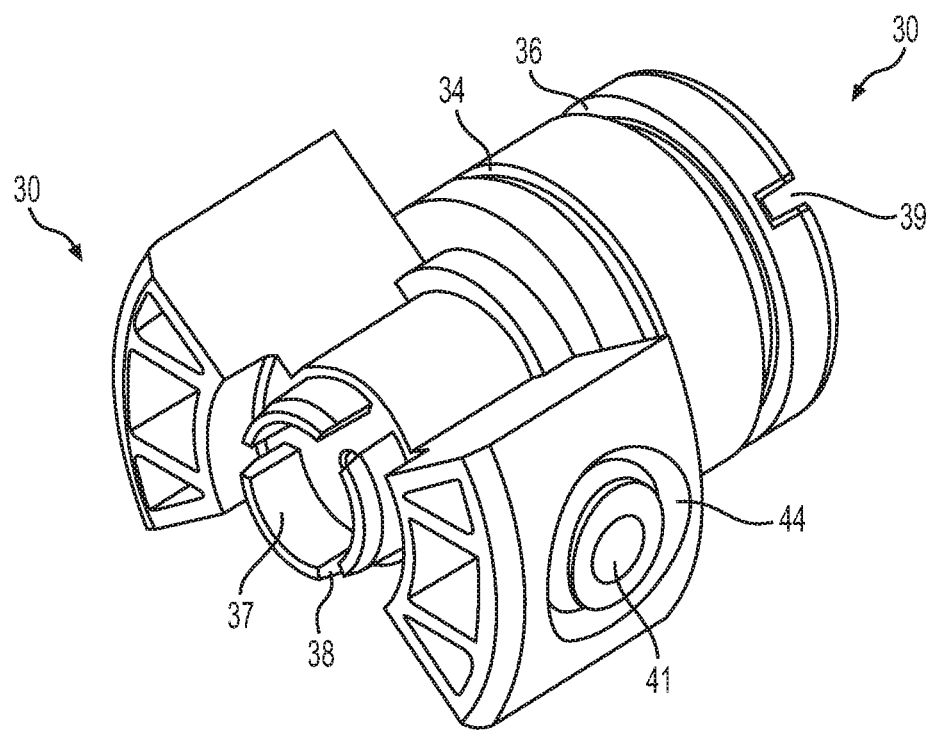
FIGS. 7A-7C are a side perspective view, a bottom perspective view, and cross-sectional perspective view, respectively, of a connector inner core of the connector, in accordance with exemplary embodiments.
Figure 7B:
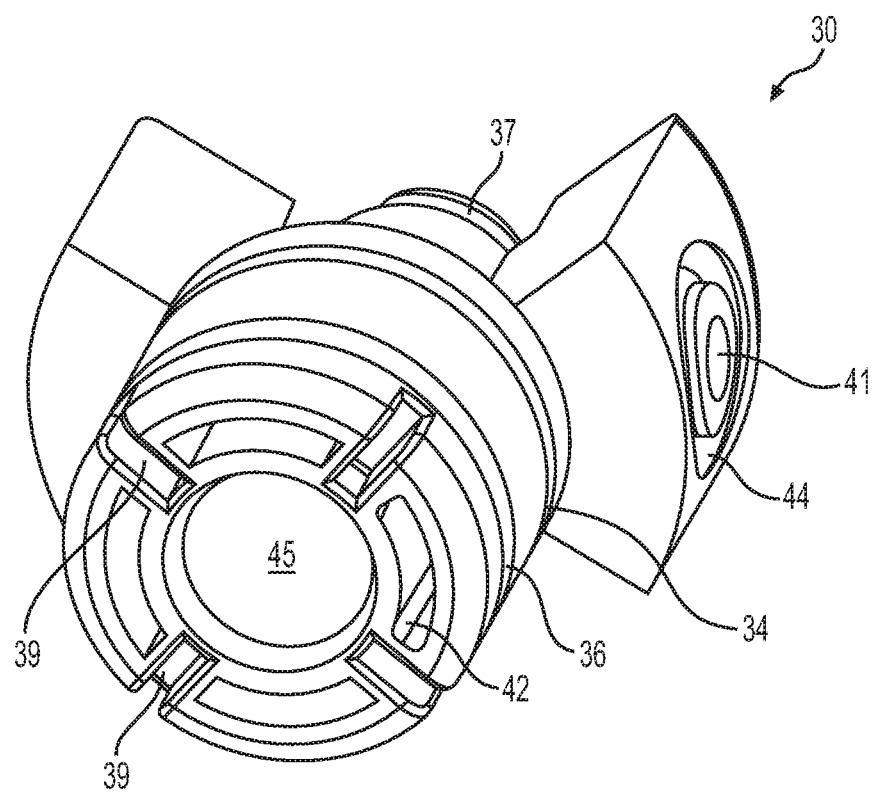
Figure 7C:
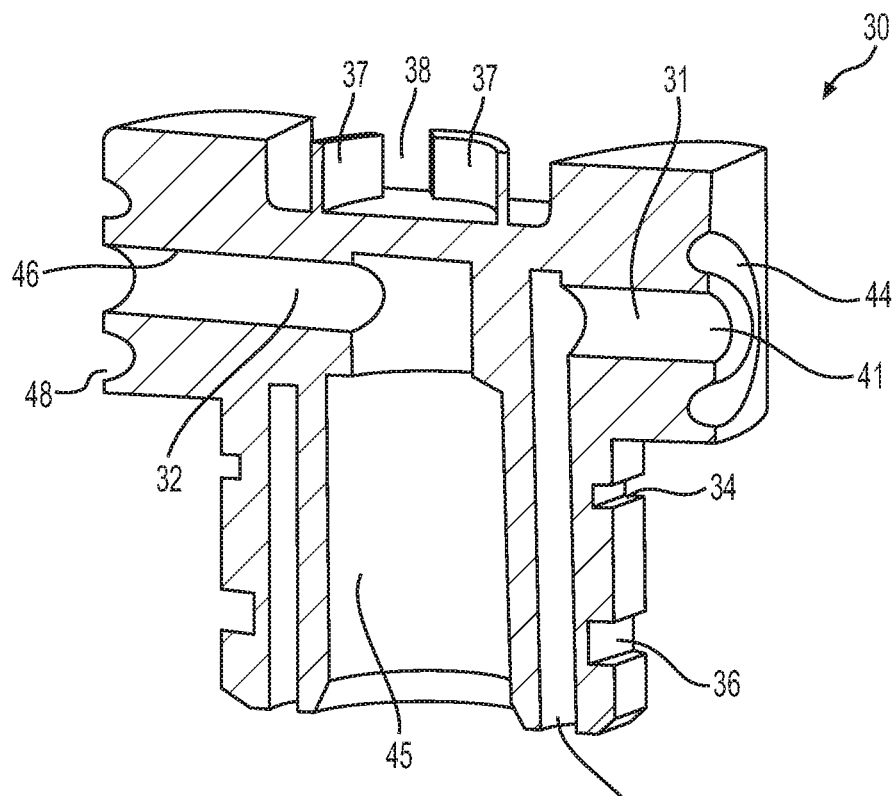
Figure 7D:
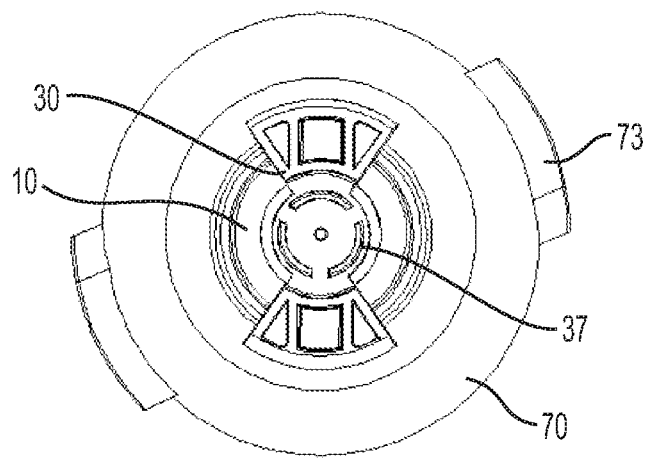
FIG. 7D is a top view of the filtration system with the connector body and other connector elements omitted, in accordance with exemplary embodiments.

With reference to FIGS. 7A-7C, an embodiment of connector inner core 30 is shown. As may be seen in the cross-section of FIG. 7C, connector inner core 30 may include inner core inlet 31 and inner core outlet 32. Inner core inlet 31 may preferably be L-shaped and may include inner core inlet entrance 41 and inner core inlet exit 42. When filtration system 100 is in the filtering configuration, inner core inlet entrance 41 may be configured to receive unfiltered water from connector body inlet 11 and inner core inlet exit 42 may deliver water to filter 60 for filtering. In some embodiments, an inner core inlet sealing groove 44 may be disposed about an inner core inlet entrance 41 on an outer surface of connector inner core 30. As may be viewed in FIGS. 2, 3A, and 3C, inner core inlet sealing ring 43 may be at least partially disposed within inner core inlet sealing groove 44. Accordingly, the inner core inlet sealing ring 43 may engage with connector inner core 30 and connector body 10 to form a seal. Such seal may advantageously prevent water from leaking into inner core inlet 31 during the bypass configuration and prevent undesirable leakage of water coming through inner core inlet 31 during the filtering configuration.

Inner core outlet 32 may preferably be L-shaped and may include inner core inlet filter tip receiving cavity 45 and inner core outlet exit 16. Filter tip receiving cavity 45 may extend along the central axis of connector inner core 30 (as well as connector 1 and system 100). When system 100 is in the filtering configuration, filter tip receiving cavity 45 may be configured to receive filtered water from filter tip 92 of filter 60, which may be disposed therein when filter 60 is mounted; and inner core outlet exit 26 may deliver filtered water to connector body outlet 12. In some embodiments, an inner core outlet sealing groove 48 may be disposed about inner core outlet exit 46 on an outer surface of connector inner core 30. As may be viewed in FIGS. 3A and 3C, inner core outlet sealing ring 47 may be at least partially disposed within inner core outlet sealing groove 48. Accordingly, the inner core outlet sealing ring 47 may engage with connector inner core 30 and connector body 10 to form a seal. Such seal may advantageously prevent water from leaking into or out of inner core outlet 32 during the bypass configuration and prevent undesirable leakage of water coming through inner core outlet 32 during the filtering configuration.

With reference to FIGS. 7A and 7C, connector inner core 30 may include a plurality of inner core rotation support protrusions 37. The plurality of inner core rotation support protrusions 37 may be disposed at the top of connector inner core 30 and surround the central axis of connector inner core 30. The plurality of inner core rotation support protrusions 37 may partially define a plurality of inner core rotation support gaps 38. The top portion of each of the plurality of inner core rotation support protrusions 37 may be configured to be disposed within annular protrusion 16 of connector body 10. During the bypass configuration, water may flow from connector body inlet 11 to connector body outlet 12 though, inter alia, inner core rotation support gaps 38.

With reference to FIG. 7B, connector inner core 30 may define a plurality of inner core engagement cavities 39. The plurality of inner core engagement cavities 39 may be disposed at the bottom of connector inner core 30 and surround filter tip receiving cavity 45 of connector inner core 30. When filter 60 is partially or fully mounted within connector 1, the plurality of inner core engagement cavities 39 may receive corresponding end cover engagement protrusions 74 of filter 60. In this manner, rotation of connector inner core 30 may be effectuated by a rotation of filter 60. Inner core inlet exit 42 may be disposed at a bottom of the connector between at least two of the plurality of engagement cavities 39. This may facilitate alignment of inner core inlet exit 42 with end cover inlet 71 of filter 60 when filter 60 is partially or fully mounted within connector 1.

In some embodiments, inner core baffle sealing groove 34 and inner core filter sealing groove 36 may be disposed on an external cylindrical surface of connector inner core 30 below inner core inlet entrance 41 and inner core outlet exit 42. As may be viewed in FIGS. 2, 3A, and 3C, inner core baffle sealing ring 33 may be at least partially disposed within inner core baffle sealing groove 34. Inner core baffle sealing ring 33 may engage with connector inner core 30 and an internal surface of baffle 50 to form a seal. Such seal may advantageously prevent water from leaking between inner core inner core 30 and baffle 50.

Similarly, inner core filter sealing ring 35 may be at least partially disposed within inner core filter sealing groove 36. Inner core filter sealing ring 35 may engage with connector inner core 30 and an internal surface of annular platform 75 of filter end cover 70 to form a seal. Such seal may advantageously prevent water from leaking between connector inner core 30 and filter 60 outside of inner core inlet 31 and inner core outlet 32.

Connector Care Baffle 50

Figure 6A:
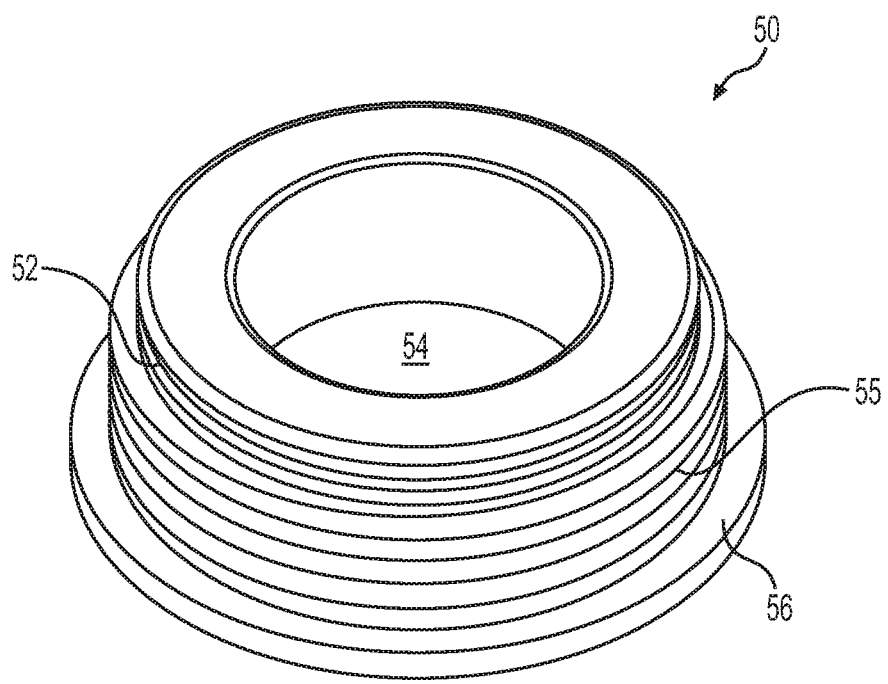
FIGS. 6A-6C are a perspective view, a perspective cross-sectional view, and an underside perspective view, respectively of a connector core baffle of the connector, in accordance with exemplary embodiments.
Figure 6B:
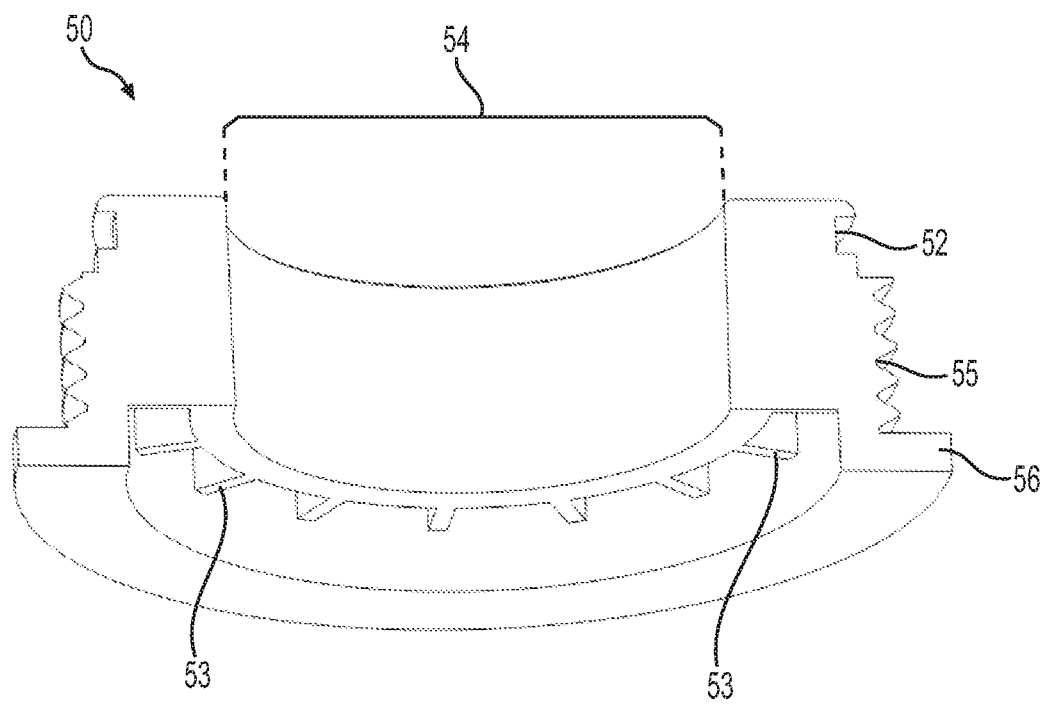
Figure 6C:
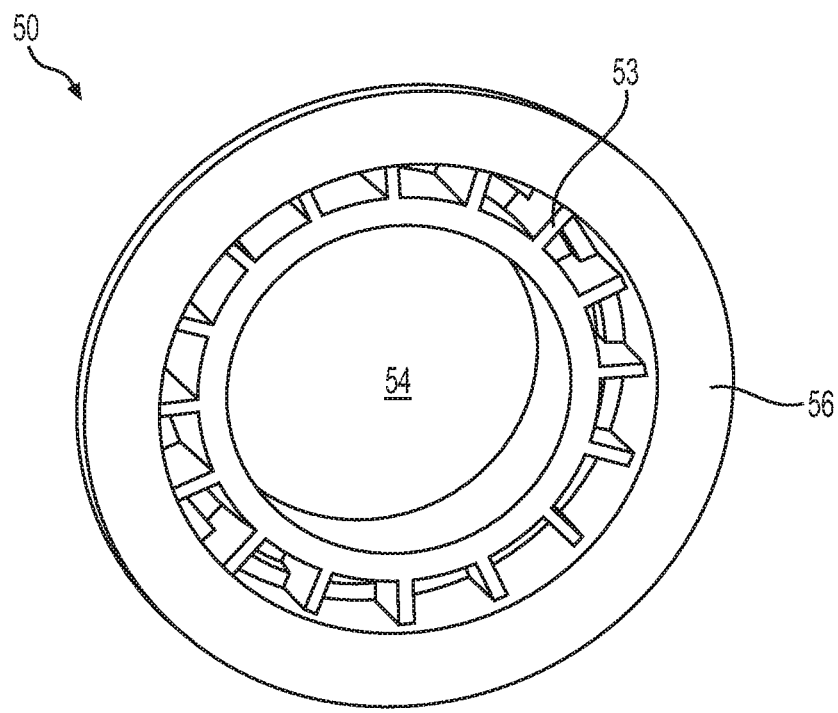

With reference to FIGS. 6A-6C, an embodiment of connector core baffle 30 is shown. Internal surfaces of connector core baffle 30 may define baffle central hole 54, which may be disposed along the central axis. As may be viewed in, for example, FIGS. 3A and 3C, a substantial portion of the lower cylindrical part of connector inner core 30 may be disposed within baffle central hole 54. Connector core baffle 30 may include external threading 55, which may be configured to engage with internal threading 17 of connector body 10. Engagement of threadings 55 and 17 may lock connector inner core 30 and in its appropriate position within connector 1.

The bottom of connector core baffle 30 may include baffle annular lip 56, which may abut an internal annular underside surface of connector body 10 when connector core baffle 30 is fully screwed into connector body 10. This may be observed in in, for example, FIGS. 3A and 3C.

As may be best viewed in FIGS. 6B and 6C, connector core baffle 30 may include a plurality of baffle ribs 53 radially disposed on it underside. During assembly of connector 1, an installation tool may engage with the plurality of baffle ribs 53; in this manner, connector core baffle 30 may be turned with sufficient force by an installation tool to securely engage threadings 55 and 17. Baffle ribs 53 may additionally provide structural strength to baffle 50.

In some embodiments, external baffle sealing groove 52 may be disposed on an external cylindrical surface of baffle 50 above external threading 55. As may be viewed in FIGS. 2, 3A, and 3C, external baffle sealing ring 51 may be at least partially disposed within external baffle sealing groove 52. External baffle sealing ring 52 may engage with baffle 50 and an internal surface of connector body 10. Such seal may advantageously prevent water from leaking between connector body 10 and baffle 50.

Filter 60

With reference to FIG. 2, filter 60 may include filter end cover 70, filter cover body 80, and filter core 90. Filter 60 is not limited to the particular embodiments disclosed herein and may share many aspects and features with prior art water filters. However, as would be appreciated by a person of one in the art, filter 60 may include additional aspects and features that result in compatibility with connector 1 and serve to accomplish the purposes of embodiments disclosed herein. As may be viewed in FIG. 1B, filter end cover 70 may be mounted upon filter cover body 80 to form a filter housing. Filter core 90 may be held within this filter housing.

Filter Cover Body 80

Figure 8A:
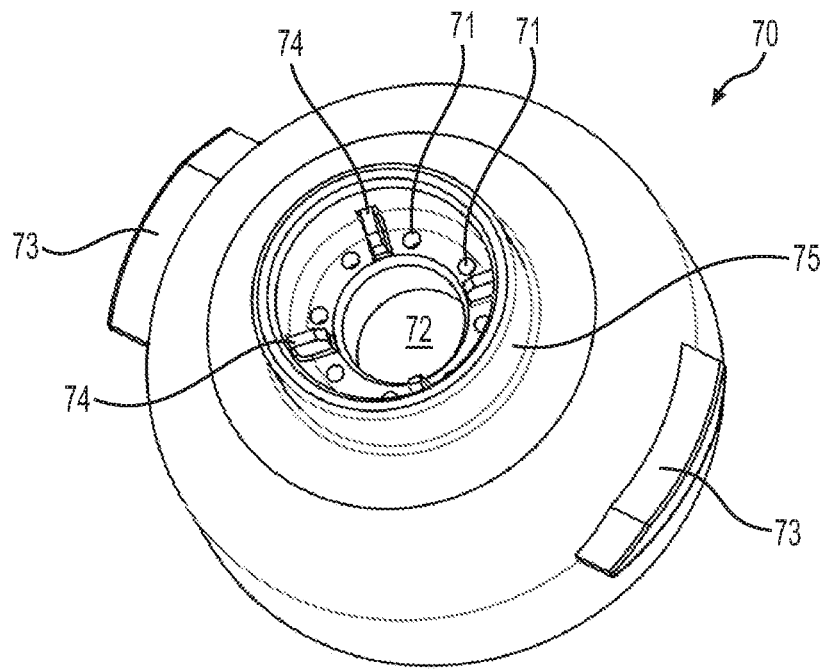
FIG. 8A is a top perspective view of a filter end cover of the filter of the filtration system, in accordance with exemplary embodiments.
Figure 8D:
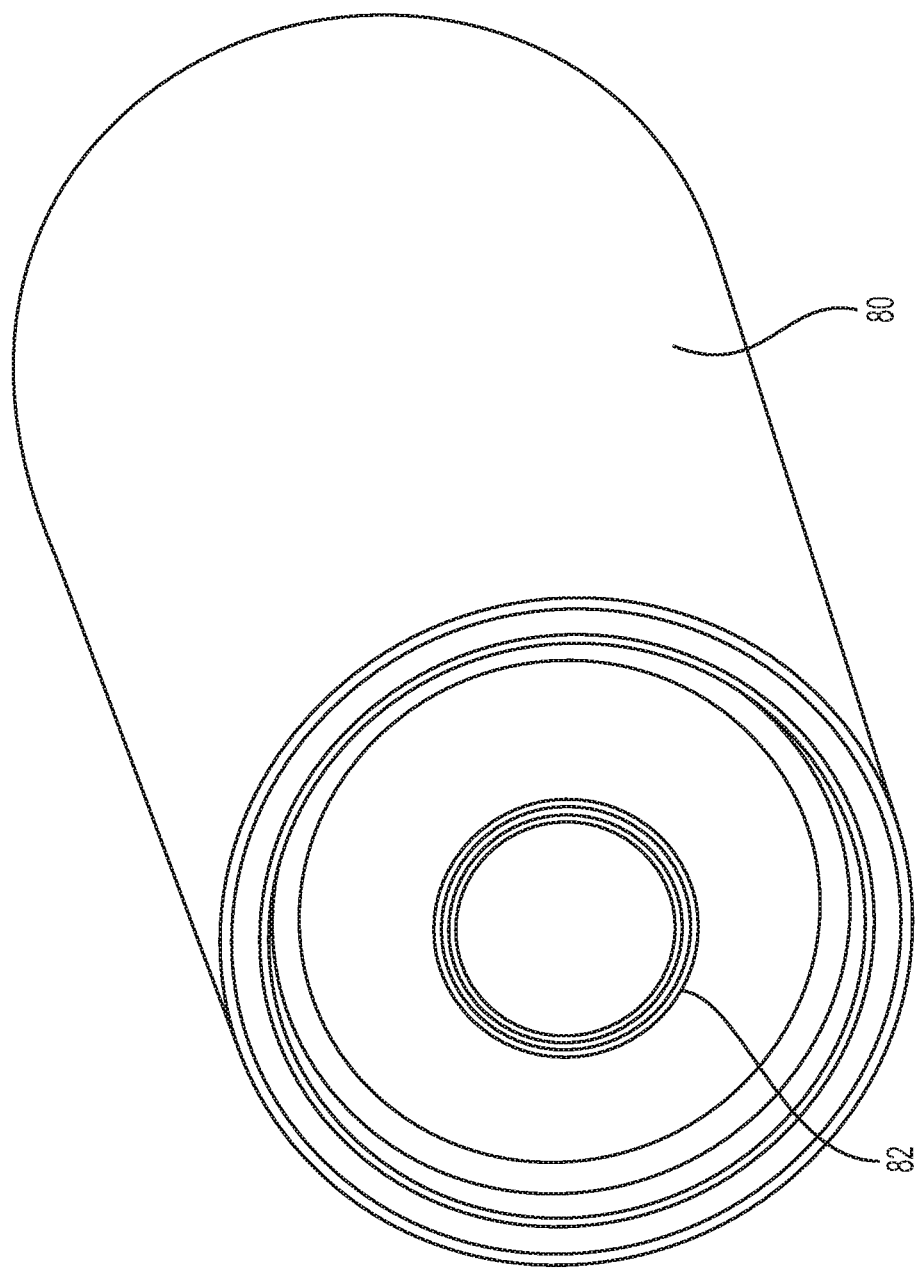
FIG. 8D is a bottom perspective view of the filter cover body of the filter, in accordance with exemplary embodiments.

With reference to FIG. 8D, filter cover body 80, may be a generally barrel-shaped structure that defines a filter cavity where filter core 90 may be disposed. The filter cavity may extend along the central axis. The bottom of filter cover body 80 may include various structures and features to improve strength. For example, as may be viewed in FIGS. 4 and 8C, a bottom surface of filter cover body 80 may be generally curved. As may be best observed in FIGS. 8C and 8D, the bottom surface of filter cover body 80 may include support ring 82 around the central axis of filter cover body 80 (and filter 60 and system 100). As may be best observed in FIG. 8C, the bottom surface of filter cover body 80 may further include a plurality of reinforcement ribs 81 extending from support ring 82. In embodiments where filter cover body 80 has a generally curved bottom surface, the plurality of reinforcement ribs 81 and support ring 82 may provide a substantially flat platform upon which filter core 90 may be disposed.

Filter End Cover 70

With reference to FIG. 8A, filter end cover 70 may define end cover central opening 72 along the central axis of filter end cover 70 (and filter 60 and system 100). Filtered water exiting filter 60 may pass through end cover central opening 72.

At the top of filter end cover 70, annular platform 75 may surround end cover central opening 72. When filter 60 is fully mounted within connector 1, annular platform 75 may abut the plurality of baffle ribs 53 or, in alternative embodiments, another portion of baffle 50.

The plurality of end cover engagement protrusions 74 may surround end cover central opening 72, may be disposed internal to annular platform 75, and may extend upward in a direction parallel to the central axis.

One or more end cover inlets 71 may be disposed between annular platform 75 and end cover central opening 72. In some embodiments, for example as shown in FIG. 8A, end cover inlets 71 may also be disposed between at least two end cover engagement protrusions 74. Water entering filter core 90 may pass through at least one end cover inlet 71.

Filter end cover 70 may also include a plurality of outwardly extending flanges 73 that may be configured to engage with inwardly extending flanges 14 of connector body 10. As shown, outwardly extending flanges 73 flanges may disposed on an outermost surface of filter end cover 70 and/or may have a curved shape to promote secure engagement with inwardly extending flanges 14.

Figure 3B:
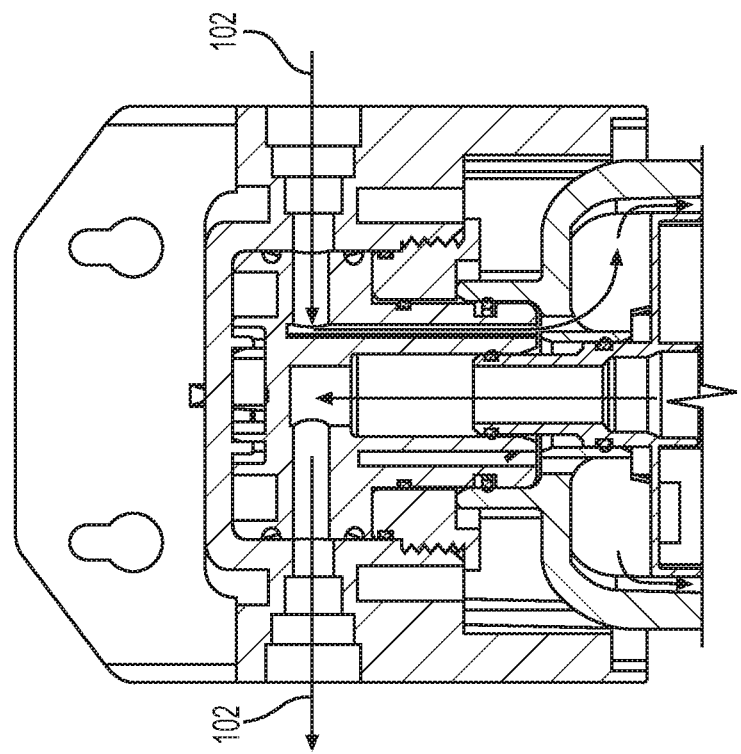
FIGS. 3A and 3B are cross-sectional views of a portion of the filtration system in a filtering configuration, in accordance with exemplary embodiments.
Figure 3A:
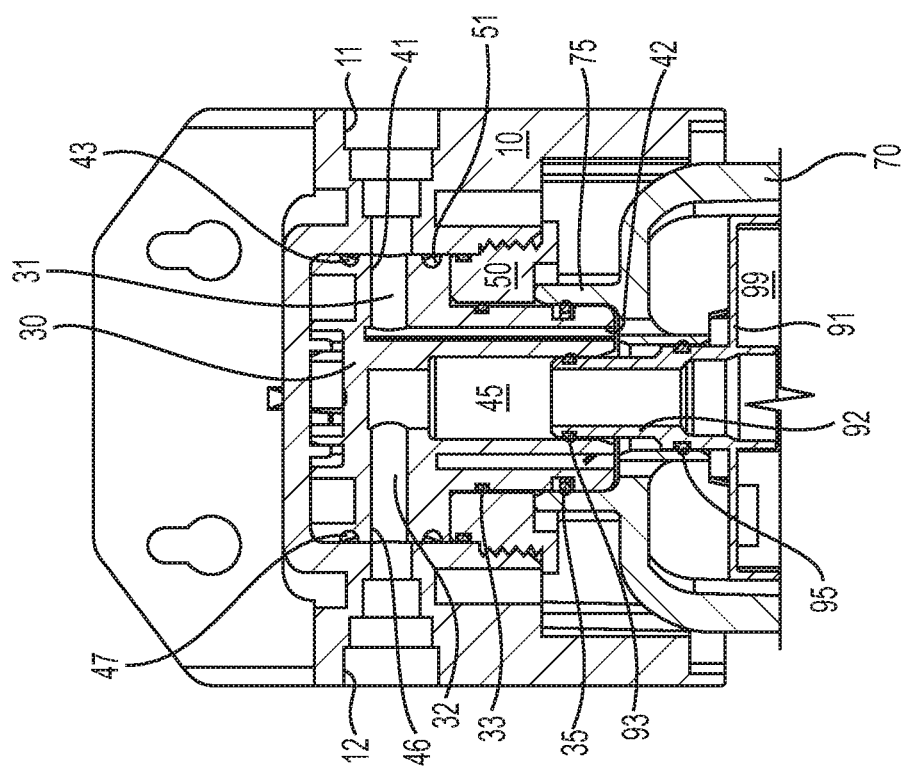
Figure 3D:
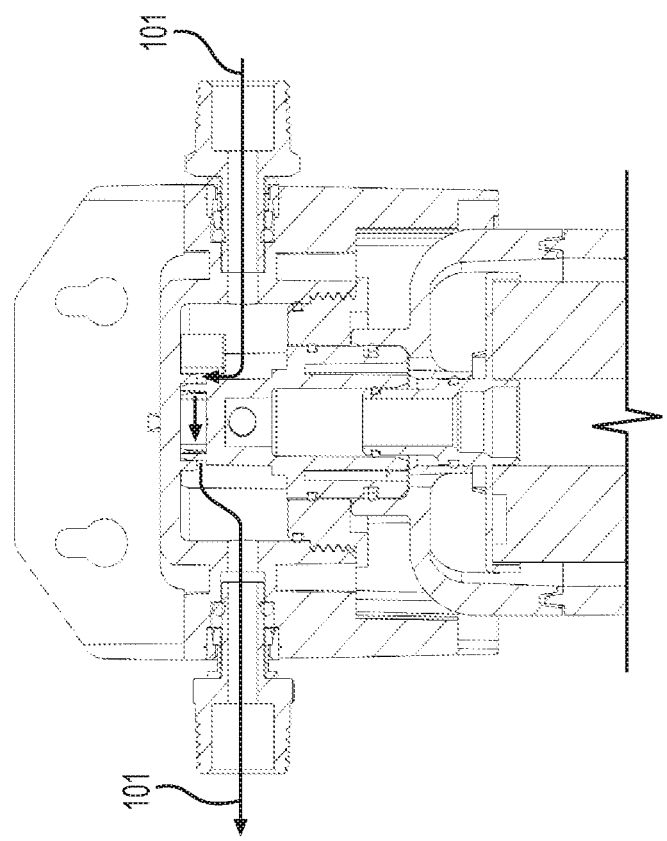
FIGS. 3C and 3D are cross-sectional views of a portion of the filtration system in a bypass configuration, in accordance with exemplary embodiments.
Figure 3C:
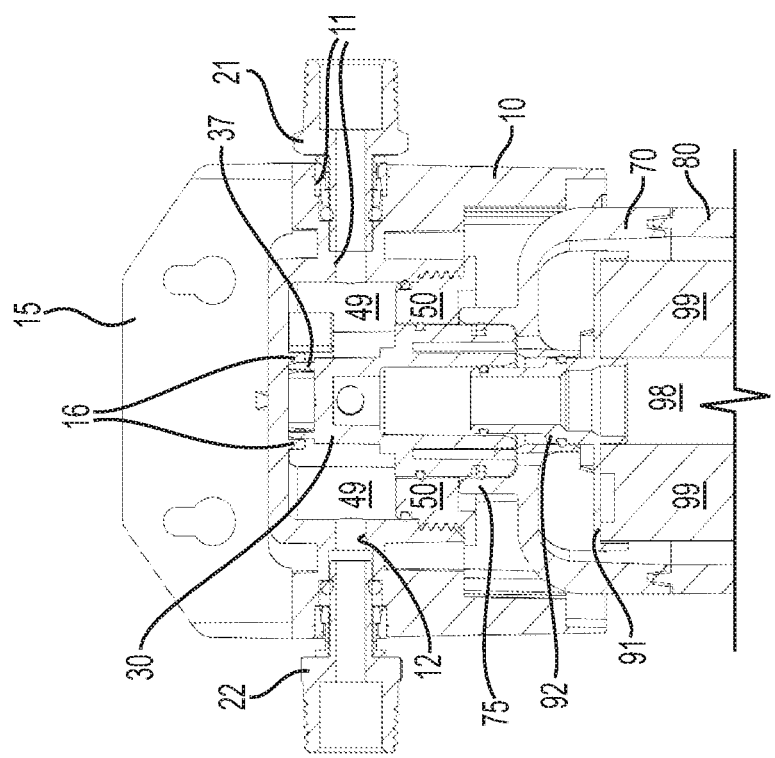
Figure 4:
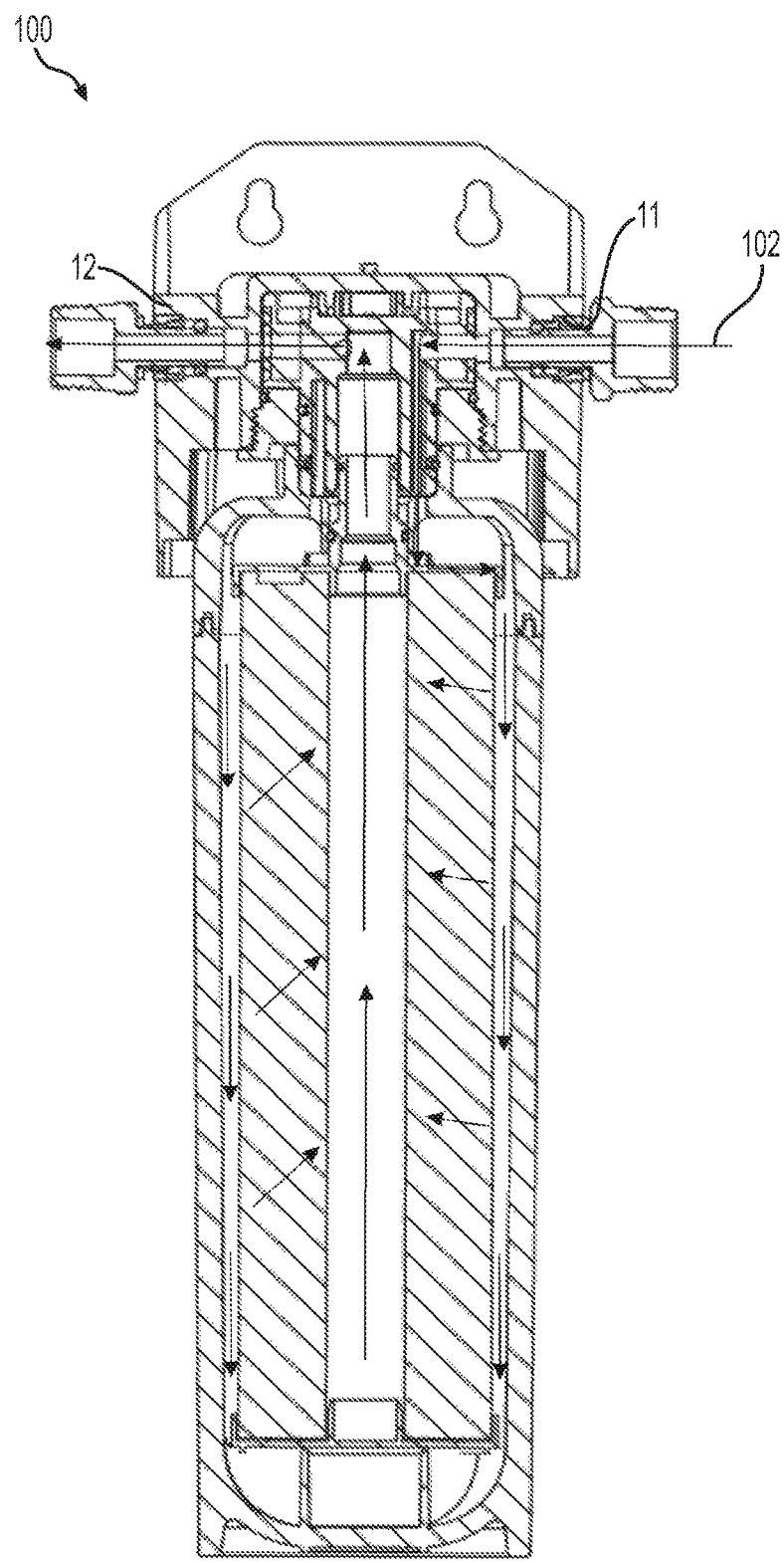
FIG. 4 is a cross-sectional view of the filtration system in the filtering configuration, in accordance with exemplary embodiments.

In some embodiments, as may be viewed in FIGS. 3C, 3D, and 4, the bottom rim of filter end cover 70 may include one or more protrusions and/or grooves configured to engage with one or more corresponding grooves and/or protrusions disposed on a top rim of filter cover body 80.

Filter Core 90

With reference to FIGS. 2 and 8B, filter core 90 may include a hollow cylindrical carbon rod 99, carbon rod cover 91, and carbon rod bottom 97. Carbon rod 99 may define filter core cavity 98 along the central axis of filter core 90 (and filter 60 and system 100). Filter core cavity 98 may be sealed by carbon rod cover 91 at its top end and by carbon rod bottom 97 at its bottom end. In some embodiments, filter core 90 may be sealed by welding.

Carbon rod cover 91 may include carbon rod cover tip 92, which may extend along the central axis and form a conduit from filter core cavity 98.

In some embodiments, carbon rod cover tip 92 may include an upper tip sealing groove 94 and a lower tip sealing groove 96. As may be viewed in FIGS. 2, 3A, 3C, and 8B, upper tip sealing ring 93 may be at least partially disposed within upper tip sealing groove 94. When filter 60 is fully mounted, upper tip sealing ring 93 may engage with carbon rod cover tip 92 and an internal surface of connector inner core 30 along filter tip receiving cavity 45 to form a seal. Such seal may advantageously prevent undesirable leakage of water from or into filter tip receiving cavity 45 when system 100 is in use. This may, for example prevent mixing of filtered and unfiltered water. Similarly, lower tip sealing ring 95 may be at least partially disposed within lower tip sealing groove 96. Lower tip sealing ring 95 may engage with carbon rod cover tip 92 and an internal surface of filter end cover 70 along end cover central opening 72 to form a seal. Such seal may advantageously prevent undesirable leakage of water within filter 60 that could result in mixing of filtered and unfiltered water.

Carbon rod bottom 97 may be generally disc shaped. Its lower surface may include protrusions to engage with gaps between and/or within the plurality of reinforcement ribs 81 and/or support ring 82 of filter cover body 90. Such engagement may further secure filter core 90 within filter 60.

It may be noted that in alternative embodiments, certain essential structures of the filtration system 100 may be reversed. For example, an alternative inner core inlet 31 may have a structure substantially similar to inner core outlet 31 and, in the filtering configuration, it may direct unfiltered water to filter 60 along the central axis; filtered water may be expelled from filter 60 via a structure substantially similar to end cover inlet 71; and an alternative inner core outlet 32 may have a structure substantially similar to inner core inlet 31.

Filtration System 100 Operation

Filtration system 100 may have a bypass configuration and a filtering configuration. It may be configured to toggle between these two configurations based on the rotational position of connector inner core 30 within connector body 10. In turn, the rotational position of connector inner core 30 may be determined by the status of filter 60 with respect to connector 1: When filter 60 is fully mounted within connector 1, connector inner core may be in a rotational position that results the filtering configuration; and when filter 60 is not fully mounted within connector 1, connector inner core may be in a rotational position that results in the bypass configuration.

During the filtering configuration, water may enter filtration system 100 through an inlet pipe, for example from a water supply; may be routed through filter 60, where it may be filtered; and may be directed to an outlet pipe such that the filtered water may be used.

During the bypass configuration, water may enter filtration system 100 through the inlet pipe and may be directed to the outlet pipe without filtering.

Connector 1 Assembly and Installation

To assemble various embodiments of connector 1, some or all of the following steps may be taken.

Inner core inlet sealing ring 43, inner core outlet sealing ring 47, inner core baffle sealing ring 33, and/or inner core filter sealing ring 35 may be inserted into the appropriate corresponding groves of connector inner core 30.

Connector inner core 30 may be inserted into main connector body cavity 13 of connector body 10. During such insertion, the plurality of inner core rotation support protrusions 37 should be positioned at least partially within annular protrusion 16. Additionally, connector inner core 30 should be inserted such that stop element 18 does not prevent connector inner core 30 from being rotated such that connector body inlet 11 may be aligned with inner core inlet 31 and connector body outlet 12 may be aligned with inner core outlet 32. Connector inner core 30 may be arranged such that its rotational position with respect to connector body 10 corresponds with the bypass configuration.

External baffle sealing ring 51 may be inserted into external baffle sealing groove 52 of baffle 50.

Baffle 50 may be inserted into main connector body cavity 13 of connector body 10 such that the lower cylindrical portion of connector inner core 30 is disposed within baffle central hole 54. Baffle 50 may be screwed into connector body 10 such that its external threading 55 fully engages with internal threading 17 of connector body 10. An installation tool that engages with the plurality of baffle ribs 53 may be used to ensure a tight and secure, installation of baffle 50.

O-rings 26 of quick insertion assemblies 21 and 22 may be inserted into connector body inlet 11 and connector body outlet 12, respectively. Insertion baffles 27 and quick-connection claws 28 of quick insertion assemblies 21 and 22, respectively, may be engaged and inserted into connector body inlet 11 and connector body outlet 12, respectively. Optionally, threaded barbs 25 of quick insertion assemblies 21 and 22 may be inserted to engage with their corresponding quick-connection claws 28.

The assembly of connector 1 may be completed.

To install various embodiments of connector 1, some or all of the following steps may be taken. The water supply should be off during initial installation of connector 1.

Connector 10 may be mounted or otherwise secured in a desired location. A user may insert screws, bolts, nails, or the like through one or more holes of hanging element 15 to secure connector 1 to a desired surface or object.

A user may connect the inlet pipe to filtration system 100 by screwing threaded barb 25 of inlet quick insertion assembly 21 into the inlet pipe or connector thereof. A user may connect the outlet pipe to filtration system 100 by screwing threaded barb 25 of outlet quick insertion assembly 22 into the outlet pipe or connector thereof.

In some embodiments, each threaded barb 25 may be removed from its corresponding quick insertion assembly 21/22 prior to its connection to the inlet/outlet pipe. Each threaded barb 25 may be screwed into the appropriate pipe and then inserted into the appropriate quick-connection claw 28 to quickly and easily effectuate installation.

In other embodiments, each threaded barb 25 may be screwed into its corresponding inlet/outlet pipe without disconnecting it from its corresponding quick-connection claw 28.

The installation of connector 1 may be completed.

Water Bypass Flow 101

When connector 1 is initially installed without mounting of filter 60, filtration system 100 should be in bypass configuration. Filtration system 100 should also be in the bypass configuration whenever filter 60 is not fully mounted within connector 1.

FIGS. 3C-3E illustrate an embodiment of filtration system 100, or portions thereof, in the bypass configuration. With reference to FIGS. 3D and 3E, water bypass flow 101 illustrates the flow of water through filtration system 100 should be in the bypass configuration.

With reference to FIG. 3C, water may enter connector 1 from the water supply inlet pipe via connector body inlet 11, in which inlet quick insertion 21 assembly may be installed. Connector inner core's 30 rotational position may be such that inner core inlet entrance 41 of connector inner core 30 is not aligned with connector body inlet 11. In certain embodiments, for example as in FIG. 3C, inner core inlet entrance 41 may be substantially perpendicular to connector body inlet 11. Accordingly, water flows from connector body inlet 11 into the inlet side of bypass void 49. Bypass void 49 may be a portion of the upper part of the connector body main cavity 13 that remains unoccupied notwithstanding the presence of connector inner core 30 elements in the upper part of the connector body main cavity 13. Accordingly, bypass void 49 may rotate within connector body 10 about the central axis in concert with connector inner core 30.

Because the water cannot flow through connector inner core 30 to connector body water outlet 12, water bypass flow 101 is forced above the central portion of connector inner core 30 and into the outlet side of bypass void 49. In preferred embodiments, pass flow 101 may pass through inner core rotation support gaps 38. From the outlet side of bypass void 49, bypass flow 101 proceeds through connector body water outlet 12, in which outlet quick insertion assembly 22 may be installed, and into the outlet pipe.

Filter 60 Mounting

To mount filter 60 in connector 1, the top portion of filter 60 may be inserted into connector 1 along the central axis. As may be visualized with reference to FIGS. 5B and 8A, to accomplish such insertion, outwardly extending flanges 73 of filter 60 should be positioned to enter connector main body cavity 13 by avoiding inwardly extended flanges 14 of connector body 10. During insertion, the plurality of end cover engagement protrusions 74 of filter 60 may mate, at least partially, with the plurality of inner core engagement cavities 39 of connector inner core 30.

Then, the user may firmly turn filter 60 until it is secure. In preferred embodiments, filtration system 100 may be configured for filter 60 to be mounted via a standard clockwise rotation, but this disclosure is not so limited. In alternative embodiments, a counter-clockwise mounting is contemplated.

The rotation of filter 60 may cause lower surfaces of outwardly extending flanges 73 of filter 60 to engage with upper surfaces inwardly extended flanges 14 of connector body 10. The engagement of flanges 73 and 14 may utilize the rotation of the filter 60 to drive filter 60 deeper into connector 1 until it is fully mounted. Such full mounting may ensure effectiveness of various seals. In certain embodiments, the flanges 73 and 14 may effectively lock filter 60 to connector 1 when filter 60 is fully mounted.

Additionally, the rotation of filter 60 may cause connector inner core 30 to rotate via the mating of the plurality of end cover engagement protrusions 74 with the plurality of inner core engagement cavities 39. This rotational movement of connector inner core 30 within connector body 10 may toggle filtration system 100 from the bypass configuration to the filtering configuration. In preferred embodiments, the rotational movement to achieve this toggling may be approximately 90 degrees. However, rotational movements of the connector inner core 30 within connector body 10 of between 60 and 120 degrees may be necessary in other embodiments. The rotational movement of connector inner core 30 may be halted when connector inner core 30 physically contacts stop element 18 of connector body 10. In preferred embodiments, this may coincide with an effective locking filter 60 to connector 1.

Once filter 60 is fully mounted, filtration system 100 may be in the filtering configuration. A user need not disconnect the water supply to mount filter 60.

Filtration Flow 102

Figure 8E:
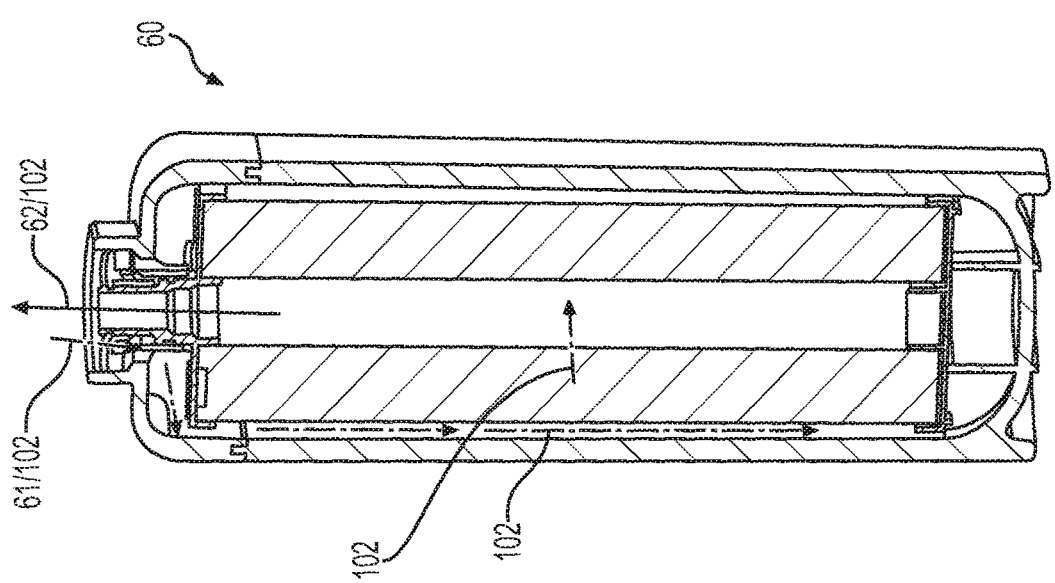
FIG. 8E is a cross-sectional view of a filter, in accordance with exemplary embodiments.

FIGS. 3A, 3B, 4, and 8E illustrate an embodiment of filtration system 100, or portions thereof, in the filtering configuration. With reference to FIGS. 3B, 4, and 8E, filtration flow 102 illustrates the flow of water through filtration system 100 in the filtration configuration.

Figure 3E:
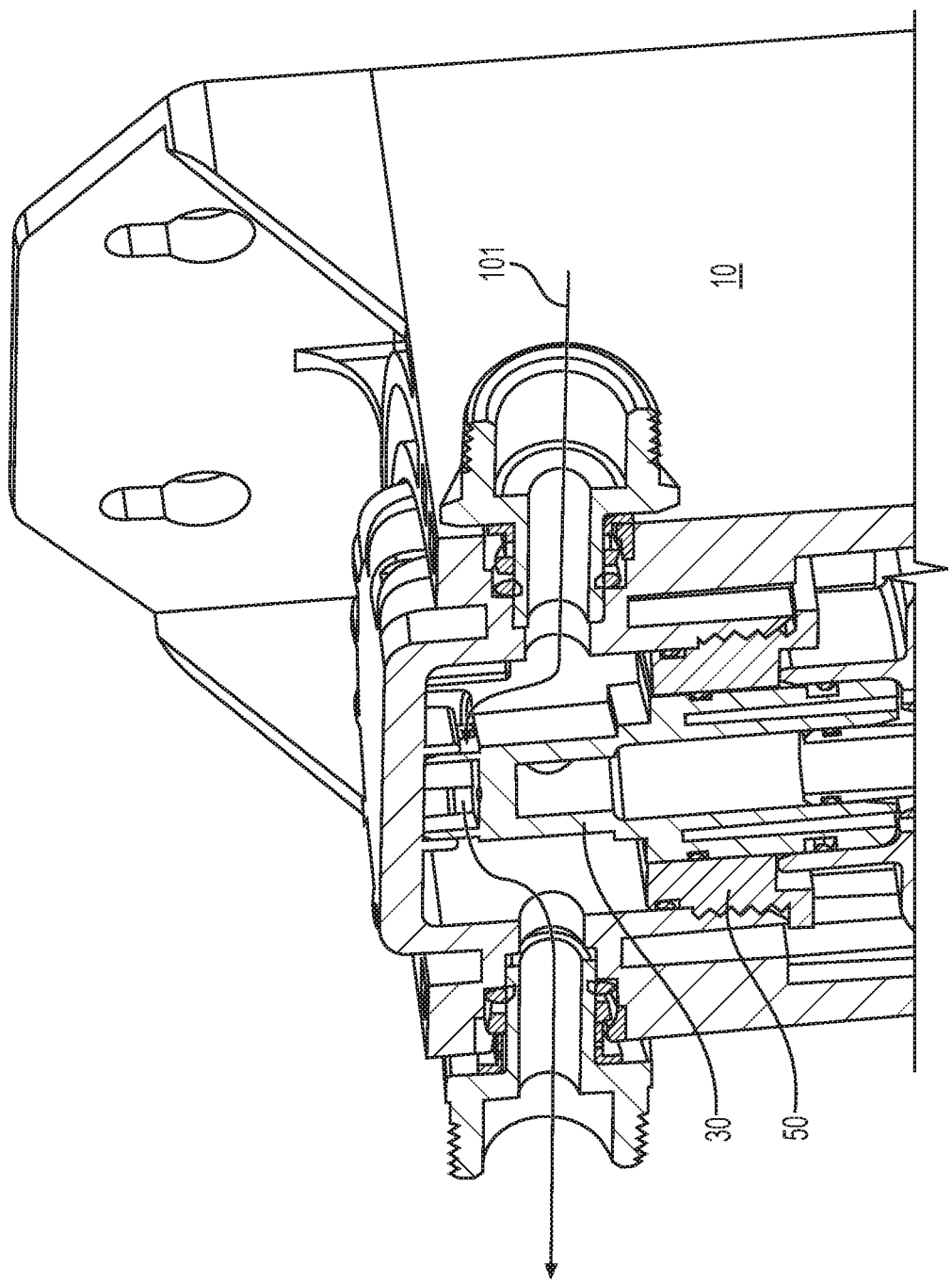
FIG. 3E is a perspective cross-sectional view of a portion of the filtration system in the bypass configuration, in accordance with exemplary embodiments.

With reference to FIG. 3A, water may enter connector 1 from the water supply inlet pipe via connector body inlet 11, in which inlet quick insertion 21 assembly may be installed (not shown in FIGS. 3A and 3B). Connector inner core's 30 rotational position may be such that inner core inlet entrance 41 of connector inner core 30 is aligned with connector body inlet 11. Accordingly, water may flow through inner core inlet 31 and exit connector inner core 30 at inner core inlet exit 42 and enter filter end cover inlet 71. With reference to FIG. 8E, filter inlet flow 61 through end cover inlet 71 is illustrated.

The unfiltered water may then proceed along the side of filter end cover 70 and be forced through the sides of carbon rod 99, whereby the water is filtered. The filtered water may be received in filter core cavity 98 and expelled from filter core 90 through carbon rod cover tip 92. With reference to FIG. 8E, filter outlet flow 62 through carbon rod cover tip 92 is illustrated.

Carbon rod cover tip 92 may be disposed within filter tip receiving cavity 45, which forms part of inner core outlet 32. Accordingly, the filtered water is received by inner core outlet 32, which routes the filtered water through inner core outlet exit 46; into connector body water outlet 12, in which outlet quick insertion assembly 22 may be installed (not shown in FIGS. 3A and 3B); and into the outlet pipe.

Filter 60 Removal

To remove filter 60 from connector 1, the user may firmly rotate filter 60 until flanges 73 and 14 are no longer engaged. Then, the user may pull filter 60 down to remove it. In preferred embodiments, filtration system 100 may be configured for filter 60 to be dismounted via a standard counterclockwise rotation, but this disclosure is not so limited. In alternative embodiments, a clockwise dismounting is contemplated.

The rotation of filter 60 may ultimately release the engagement of lower surfaces of outwardly extending flanges 73 of filter 60 and upper upper surfaces of inwardly extended flanges 14 of connector body 10. This may permit filter 60 to be released from connector 1.

Additionally, the rotation of filter 60 may cause connector inner core 30 to turn via the mating of the plurality of end cover engagement protrusions 74 with the plurality of inner core engagement cavities 39. This rotational movement of connector inner core 30 within connector body 10 may toggle filtration system 100 from the filtering configuration to the bypass configuration. In preferred embodiments, filtration system 100 is converted to the bypass configuration after only a small rotational movement of the connector inner core 30, wherein the filter remains partially mounted. In some embodiments, the plurality of end cover engagement protrusions 74 and the plurality of inner core engagement cavities 39 may not be unmated until the rotational movement of connector inner core 30 in the un-mounting direction is approximately 90 degrees. At that point, outwardly extending flanges 73 of filter 60 and inwardly extended flanges 14 of connector body 10 may clear each other, permitting filter 60 to be fully removed by downward force.

Once filter 60 is at least partially dismounted, filtration system 100 may be in the bypass configuration. A user need not disconnect the water supply to disconnect filter 60.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

It is noted that, as used herein and in any appended claims, the singular forms "a", "an", and "the" include plural referents unless the context clearly dictates otherwise. It is further noted that any claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure. Any recited method can be carried out in the order of events recited or in any other order that is logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

In the present disclosure, the terms "first," "second," and the like are used for descriptive purposes only, and are not to be construed as indicating or implying a relative importance or a set number of technical features. Thus, features defining "first," "second," etc. may include one or more of the features, either explicitly or implicitly. In the description, unless otherwise stated, "a plurality of" means two or more. It should also be noted that terms "installation," "connected with each other," "connected," and the like are to be understood broadly, and may describe, for example, a fixed connection, a disassembled connection, an integral connection, a mechanical connection, an electrical connection, a direct connection, an indirect connection through an intermediate medium, and/or an internal connection between the inner portions of two elements. The specific meanings of the above and similar terms in the context of the present disclosure may be readily understood by a person of ordinary skill in the art.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of any claims that follow. The specification and drawings are accordingly to be regarded in an illustrative rather than restrictive sense.

I claim:

1. A water filtration system, comprising:
   a connector, the connector including a connector body, a connector inner core, a connector core baffle, a connector body water inlet of the connector body, and a connector body water outlet of the connector body; and
   a filter configured to be mounted in the connector, wherein:
   the water filtration system has a filtering configuration and a bypass configuration;
   in the filtering configuration, the water filtration system is configured to direct water received via the connector body water inlet through the filter and out the connector body water outlet;
   in the bypass configuration, the water filtration system is configured to direct water received via the connector body water inlet out the connector body water outlet without passage through the filter;
   the water filtration system is in the filtering configuration when the filter is fully mounted in the connector;
   the water filtration system is in the bypass configuration when the filter is partially mounted in the connector and when the filter is not mounted in the connector;

the water filtration system is configured to switch between the filtering configuration and the bypass configuration by a rotation of the connector inner core about a central axis within the core body;

the connector body defines a main connector body cavity;

the connector body includes an annular protrusion disposed at the top of the main connector body cavity and around the central axis;

the connector inner core includes a plurality of inner core rotation support protrusions disposed at the top of the connector inner core around the central axis; and the plurality of inner core rotation support protrusions are at least partially disposed within the annular protrusion wherein the connector inner core includes an inner core inlet and an inner core outlet;

the inner core inlet is L-shaped;

the inner core outlet is L-shaped;

the inner core inlet is configured to direct water from the connector body water inlet into the filter when the water filtration system is in the filtering configuration;

the inner core outlet is configured to direct water from the filter to the connector body water outlet when the water filtration system is in the filtering configuration.

2. The water filtration system of claim 1, wherein further:

the plurality of inner core rotation support protrusions define a plurality of inner core rotation support gaps; and the connector is configured to direct water through the plurality of inner core rotation support gaps when the water filtration system is in the bypass configuration.

3. The water filtration system of claim 1, wherein further:

the connector body defines a main connector body cavity;

the connector body includes a plurality of inwardly extending flanges disposed near a bottom of the connector body;

the filter includes a plurality of outwardly extending flanges disposed near a top of the filter;

the inwardly extending flanges are configured to engage with the outwardly extending flanges of the filter when the filter is fully mounted in the connector.

4. The water filtration system of claim 1, wherein:

the connector body defines a main connector body cavity;

the connector body includes a stop element disposed at the top of the main connector body cavity; and the stop element is configured to limit the rotation of the connector inner core within the connector body to between 60 and 120 degrees.

5. A water filtration system, comprising:

a connector, the connector including a connector body, a connector inner core, a connector core baffle, a connector body water inlet of the connector body, and a connector body water outlet of the connector body; and a filter configured to be mounted in the connector, wherein:

the water filtration system has a filtering configuration and a bypass configuration;

in the filtering configuration, the water filtration system is configured to direct water received via the connector body water inlet through the filter and out the connector body water outlet;

in the bypass configuration, the water filtration system is configured to direct water received via the connector body water inlet out the connector body water outlet without passage through the filter;

the water filtration system is in the filtering configuration when the filter is fully mounted in the connector;

the water filtration system is in the bypass configuration when the filter is partially mounted in the connector and when the filter is not mounted in the connector;

the connector body defines a main connector body cavity;

the connector body includes a stop element disposed at the top of the main connector body cavity;

the stop element is configured to limit the rotation of the connector inner core within the connector body to between 60 and 120 degrees; and the stop element is configured to limit the rotation of the connector inner core within the connector body to approximately 90 degrees.

6. The water filtration system of claim 1, wherein:

the inner core outlet includes a filter tip receiving cavity disposed at a bottom of the connector inner core along the central axis;

the bottom of the connector inner core defines a plurality of engagement cavities surrounding the filter tip receiving cavity; and the inner core inlet includes an inner core inlet exit disposed at a bottom of the connector inner core between at least two of the plurality of engagement cavities.

7. The water filtration system of claim 6, wherein:

the filter includes an end cover and a filter tip; and the end cover includes an end cover central opening along the central axis, a plurality of end cover engagement protrusions surrounding the end cover central opening, and an end cover inlet disposed between at least two of the end cover protrusions; and the filter tip is at least partially disposed within the end cover central opening.

8. The water filtration system of claim 7, wherein the filter tip receiving cavity is configured to receive the filter tip;

the plurality of end cover engagement protrusions are configured to engage with the plurality of engagement cavities; and the end cover inlet is configured to align with the inner core inlet exit when the filter is partially or fully mounted in the connector.

9. The water filtration system of claim 8, wherein:

an engagement between the plurality of end cover engagement protrusions and the plurality of engagement cavities, respectively, is configured to enable the rotation of the connector inner core by a rotation of the filter.

10. The water filtration system of claim 1, further comprising an inner core baffle sealing ring and an inner core filter sealing ring, wherein:

the connector inner core includes an inner core baffle sealing groove and an inner core filter sealing groove;

the inner core baffle sealing ring is at least partially disposed within the inner core baffle sealing groove;

the inner core baffle sealing ring engages with the connector inner core and the connector core baffle to form a first seal;

the inner core filter sealing ring is at least partially disposed within the inner core filter sealing groove; and when the filter is fully mounted in the connector, the inner core filter sealing ring engages with the connector inner core and the filter to form a second seal.

11. The water filtration system of claim 1, further comprising an inner core inlet sealing ring and an inner core outlet sealing ring, wherein:

the connector inner core includes an inner core inlet sealing groove disposed about an entrance to the inner core inlet;
the connector inner core includes an inner core outlet sealing groove disposed about an exit to the inner core outlet;
the inner core inlet sealing ring is at least partially disposed within the inner core inlet sealing groove;
the inner core outlet sealing ring is at least partially disposed within the inner core outlet sealing groove;
the inner core inlet sealing ring engages with the connector inner core and the connector body to form a first seal; and
the inner core outlet sealing ring engages with the connector inner core and the connector body to form a second seal.

12. The water filtration system of claim 1, wherein further:
the inner core outlet includes a filter tip receiving cavity around the central axis;
the filter includes a filter tip;
the filter tip is disposed within the filter tip receiving cavity when the filter is fully mounted in the connector.

13. The water filtration system of claim 12, further comprising a filter tip outlet upper sealing ring, wherein:
the filter tip includes a filter tip outlet upper sealing groove;
the filter tip outlet upper sealing ring is at least partially disposed within the filter tip outlet upper sealing groove;
the filter tip outlet upper sealing ring engages with an interior surface of the connector inner core and the filter tip to form a seal when the filter is mounted in the connector.

14. A water filtration system, comprising:
a connector, the connector including a connector body, a connector inner core, a connector core baffle, a connector body water inlet of the connector body, and a connector body water outlet of the connector body;
a filter configured to be mounted in the connector;
an inlet quick insertion assembly; and
an outlet quick insertion assembly, wherein:
the water filtration system has a filtering configuration and a bypass configuration;
in the filtering configuration, the water filtration system is configured to direct water received via the connector body water inlet through the filter and out the connector body water outlet;
in the bypass configuration, the water filtration system is configured to direct water received via the connector body water inlet out the connector body water outlet without passage through the filter;
the water filtration system is in the filtering configuration when the filter is fully mounted in the connector;
the water filtration system is in the bypass configuration when the filter is partially mounted in the connector and when the filter is not mounted in the connector;
the water filtration system is configured to switch between the filtering configuration and the bypass configuration by a rotation of the connector inner core about a central axis within the core body;
the inlet quick insertion assembly is configured to be installed within the connector body water inlet;
the outlet quick insertion assembly is configured to be installed within the connector body water outlet;
the inlet quick insertion assembly includes a first threaded barb, a first O-ring, a first baffle, and a first quick-connection claw; and
the outlet quick insertion assembly includes a second threaded barb, a second O-ring, a second baffle, and a second quick-connection claw.

15. A water filtration system, comprising:
a connector, the connector including a connector body, a connector inner core, a connector core baffle, a connector body water inlet of the connector body, and a connector body water outlet of the connector body; and
a filter configured to be mounted in the connector,
wherein:
the water filtration system has a filtering configuration and a bypass configuration;
in the filtering configuration, the water filtration system is configured to direct water received via the connector body water inlet through the filter and out the connector body water outlet;
in the bypass configuration, the water filtration system is configured to direct water received via the connector body water inlet out the connector body water outlet without passage through the filter;
the water filtration system is in the filtering configuration when the filter is fully mounted in the connector;
the water filtration system is in the bypass configuration when the filter is partially mounted in the connector and when the filter is not mounted in the connector;
the connector inner core includes an inner core inlet and an inner core outlet;
the inner core inlet is L-shaped;
the inner core outlet is L-shaped;
the inner core inlet is configured to direct water from the connector body water inlet into the filter when the water filtration system is in the filtering configuration;
the inner core outlet is configured to direct water from the filter to the connector body water outlet when the water filtration system is in the filtering configuration
the inner core outlet includes a filter tip receiving cavity around the central axis;
the filter includes a filter tip; and
the filter tip is disposed within the filter tip receiving cavity when the filter is fully mounted in the connector.

16. The water filtration system of claim 15, further comprising a filter tip outlet upper sealing ring, wherein:
the filter tip includes a filter tip outlet upper sealing groove;
the filter tip outlet upper sealing ring is at least partially disposed within the filter tip outlet upper sealing groove;
the filter tip outlet upper sealing ring engages with an interior surface of the connector inner core and the filter tip to form a seal when the filter is mounted in the connector.

17. The water filtration system of claim 15, wherein further:
the connector body defines a main connector body cavity;
the connector body includes a plurality of inwardly extending flanges disposed near a bottom of the connector body;
the filter includes a plurality of outwardly extending flanges disposed near a top of the filter;

the inwardly extending flanges are configured to engage with the outwardly extending flanges of the filter when the filter is fully mounted in the connector.

18. The water filtration system of claim 15, wherein:
the connector body defines a main connector body cavity;
the connector body includes a stop element disposed at the top of the main connector body cavity; and
the stop element is configured to limit the rotation of the connector inner core within the connector body to between 60 and 120 degrees.

19. The water filtration system of claim 5, wherein:
the water filtration system is configured to switch between the filtering configuration and the bypass configuration by a rotation of the connector inner core about a central axis within the core body.

* * * * *